United States Patent
Shindgikar et al.

(10) Patent No.: US 8,689,869 B2
(45) Date of Patent: Apr. 8, 2014

(54) METHOD FOR PROVIDING THIXOTROPHY TO FLUIDS DOWNHOLE

(75) Inventors: Nikhil Shindgikar, Paris (FR); Jesse Lee, Paris (FR); Slaheddine Kefi, Velizy Villacoublay (FR)

(73) Assignee: Schlumberger Technology Corporation, Sugar Land, TX (US)

(*) Notice: Subject to any disclaimer, the term of this patent is extended or adjusted under 35 U.S.C. 154(b) by 296 days.

(21) Appl. No.: 12/997,173

(22) PCT Filed: Jun. 9, 2009

(86) PCT No.: PCT/EP2009/004197
§ 371 (c)(1),
(2), (4) Date: Feb. 17, 2011

(87) PCT Pub. No.: WO2009/152989
PCT Pub. Date: Dec. 23, 2009

(65) Prior Publication Data
US 2011/0139454 A1 Jun. 16, 2011

(30) Foreign Application Priority Data
Jun. 18, 2008 (EP) .................... 08158495

(51) Int. Cl.
*E21B 33/13* (2006.01)
*C09K 8/02* (2006.01)
*C09K 8/74* (2006.01)

(52) U.S. Cl.
USPC .............. 166/292; 166/300; 175/72; 507/269

(58) Field of Classification Search
None
See application file for complete search history.

(56) References Cited

U.S. PATENT DOCUMENTS

| | | | |
|---|---|---|---|
| 2,836,555 A | 7/1956 | Armentrout | |
| 3,823,939 A | 7/1974 | Bottorff | |
| 3,898,165 A | 8/1975 | Ely et al. | |
| 4,040,967 A | 8/1977 | Nimerick et al. | |
| 4,542,791 A * | 9/1985 | Drake et al. | 166/291 |
| 4,663,663 A | 5/1987 | Lee | |
| 4,888,120 A * | 12/1989 | Mueller et al. | 507/227 |
| 6,279,655 B1 * | 8/2001 | Pafitis et al. | 166/294 |
| 6,840,318 B2 * | 1/2005 | Lee et al. | 166/293 |
| 2002/0004464 A1 * | 1/2002 | Nelson et al. | 507/200 |
| 2003/0236171 A1 | 12/2003 | Nguyen et al. | |

FOREIGN PATENT DOCUMENTS

| | | |
|---|---|---|
| WO | 9428085 | 12/1994 |
| WO | 9620899 | 7/1996 |

* cited by examiner

*Primary Examiner* — Zakiya W Bates
*Assistant Examiner* — Silvana Runyan
(74) *Attorney, Agent, or Firm* — Michael Dae

(57) ABSTRACT

An encapsulated thixotropy agent may be added to aqueous well service fluids. Such fluids include drilling fluids, cement slurries and polymer pills. The well service fluid may be subjected to shearing action downhole, causing the thixotropy agent to be released and imparting thixotropy to the fluid. The thixotropy agent comprises a dry suspension of synthetic layered silicates.

18 Claims, 3 Drawing Sheets

METHOD FOR PROVIDING THIXOTROPHY TO FLUIDS DOWNHOLE

TECHNICAL FIELD

This invention relates to a method of changing a fluid rheological properties downhole. In particular the invention relates to imparting thixotropy on demand at a known place to prevent or cure loss circulation in a wellbore.

BACKGROUND ART

Lost circulation is a problem in the oilfield industry. Many technologies have been used to help combat lost circulation. Polymer pills, reactive mud chemistries, fibers, flakes, sized granules based on optimum particle size distribution or ideal packing theory, resilient materials, water swellable polymers, thixotropic cements are some of the methods used to attempt combat lost circulation.

Thixotropic agents can provide fluids with the ability to lose viscosity when being sheared, such as by pumping, and then to return to a highly viscous form when at rest. The use of thixotropic agents for treating drilling fluids and well-servicing fluids is known. For example U.S. Pat. No. 4,888,120 describes adding synthetic layered silicates combined with synthetic polymers to make a high temperature stable thixotropic material to be added to the water based drilling fluids during preparation of the fluid.

WO9620899 describes a thixotropic material comprising smectite clays which is capable of rapid gelling for cementicious formulations to help plug lost circulation zones.

U.S. Pat. No. 4,663,663 discloses a shear thickening composition for well control fluids comprising a water-in oil emulsion having clay dispersed in the oil phase and the aqueous phase containing dissolved polyacrylamide and a polycarboxylic acid. Each of the dispersed aqueous droplets being coated with a polymeric material that is broken when subjected to high shear forces.

The present invention provides a method to impart thixotropy to fluids downhole at a known location so as to prevent loss circulation and improve wellbore strengthening during drilling, and/or assist cuttings removal from the wellbore.

DISCLOSURE OF THE INVENTION

A first aspect of the invention comprises a method of providing thixotropy to a fluid downhole comprising:
adding an encapsulated thixotropic agent to a fluid at the surface;
introducing the fluid into a borehole; and
subjecting the fluid to a shearing action, so as to release the thixotropic agent into the fluid.

More preferably the invention comprises a method of increasing the viscosity of a fluid downhole comprising the steps of:
adding an encapsulated thixotropic agent to a fluid at the surface; introducing the fluid into a borehole; and
subjecting the fluid to a shearing action, so as to release the thixotropic agent into the fluid.

Preferably the thixotropic agent is encapsulated in a shear sensitive structure. The shear sensitive structure may comprise a coating of resin and porous silica The thixotropic agent may be added to a drilling fluid, cementitious formulation or polymer pill. Preferably the drilling fluid is water based.

The thixotropic agent is preferably a dry suspension of synthetic layered silicates. In particular it is preferred the thixotropic agent is a hectorite clay.

The shearing action may be caused by a restriction at the bottom hole assembly. Preferably the shearing action is caused by a restriction of flow through the drill bit.

The thixotropic agent is preferably released after the drilling fluid exits the drill bit.

The thixotropic agent may be present in the fluid in an amount of 1% to 10% by weight thereof.

The method may further comprise adding lost circulation material at the surface to the fluid. The lost circulation material may comprise flakes, organic and/or inorganic fibers, multimodal particles, and/or granules based on optimum particle size distribution or ideal packing theory.

In a second aspect, the invention comprises a composition for providing thixotropy and/or increasing viscosity to a fluid downhole comprising a thixotropic agent wherein the thixotropic agent is encapsulated in a shear sensitive structure, such that the structure will rupture when subjected to shearing action.

By increasing viscosity it is to be understood that the viscosity when the fluid is at rest is sufficiently increased so as to prevent loss circulation and improve wellbore strengthening during drilling, and/or assist cuttings removal from the wellbore.

MODE(S) FOR CARRYING OUT THE INVENTION

Figure 1:
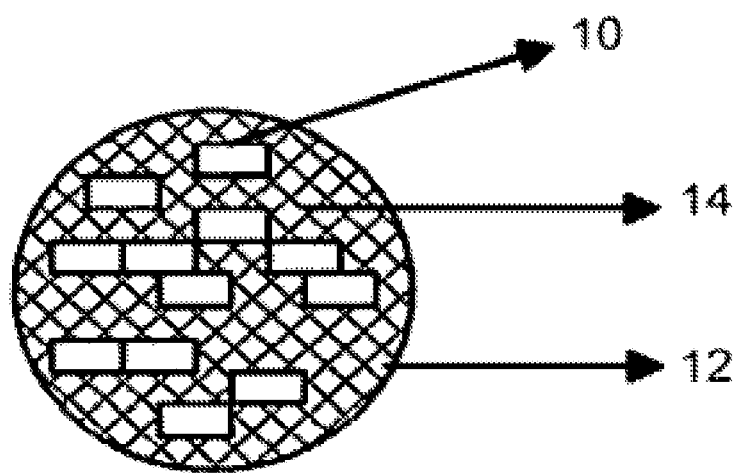
FIG. 1 shows a schematic of the encapsulated thixotropic agent.

The invention is now described by way of example. A thixotropic agent is encapsulated in a shear sensitive structure. As shown in FIG. 1 a dry suspension may comprise an encapsulation of synthetic layered silicates 10 with a shear sensitive coating of resin 12 and porous silica 14. Although other coatings to encapsulate the thixotropic agent may be used. The thixotropic agents give the fluid the ability to lose viscosity when being sheared such as by pumping and to return to a gelled structure when at rest. The thixotropic agent can be any suitable agent for imparting thixotropy to the fluid for example synthetic layered silicates, and smectite clays, such as a hectorite clay.

When drilling, once loss circulation is observed the dry suspension of encapsulated thixotropic agent may be added to the water based drilling fluid on the surface and pumped downhole though the drill pipe and/or drill bit.

The borehole assembly does not need to be tripped out to pump the formulation, unlike when cementicious formulations are used to prevent loss circulation. The drill bit can be placed at the desired location downhole at the loss zone and the water based drilling fluid with encapsulated thixotropic agent could be pumped through the drill bit nozzles. The thixotropic agent is preferably subjected to a shearing action caused by a restriction in the bottom hole assembly which produces an extensional flow, for example at the drill bit. The coating isolates the thixotropic agent from the fluid until the shear forces, applied through the drill bit nozzle, causes the coating to break and releases the encapsulated active product, i.e. Laponite a synthetic layered silicate, into the water based drilling fluid. Due to the downhole conditions there will be a rapid hydration of Laponite which will impart thixotropy to the drilling fluid.

The shearing action and pressure drop which occurs at the restriction in the nozzle causes the coating of the thixotropic agent to break. Therefore the active content is only released from its coating into the fluid when the drilling fluid has flowed through the drill bit nozzle, and therefore thixotropy is only imparted on the drilling fluid when the fluid comes out of the drill bit.

The present invention has a number of advantages over earlier system for imparting thixotropy on drilling fluids. Indeed, the thixotropic agent is isolated from the fluid as it is being pumped down the drill pipe excess; concentration of the thixotropic agent may be used easily without causing any pumping or rheology issues for the drilling fluid that would normally be associated with the use of such concentrations of a thixotropic agent. For example more than 10% by weight of water (BWOW) of Laponite may be used. Stopping and pumping is possible even at excess concentration of the thixotropic agent, as the thixotropic agent will only be exposed to the water based drilling fluid after the drill bit and not before. As higher thixotropic agent concentrations may be used, higher yield stress will be possible at downhole conditions.

When a natural or untreated thixotropic agent is added to the fluid on the surface and then pumped downhole through coiled tubing and/or subjected to an excess shear environment, this may degrade the performance of the thixotropic agent due to breaking of the molecular chains of the agent. However in the present invention as the thixotropic agent is encapsulated, it is protected as it is pumped down the tubing until the encapsulation is broken by the shearing action at the drill bit.

A further advantage of the invention is that the lost circulation materials, (LCM) can be combined with the drilling fluid and encapsulated thixotropic agent. LCM such as organic and inorganic fibres of different size, shapes and aspect ratios, multimodal particles or granules based on optimum particle size distribution or ideal packing theory, flakes sized particles etc, may also be mixed at the surface with the water based drilling fluid. The LCM can be pumped through the drill bit nozzles to be released into the borehole at the loss zone. LCM, especially fibres, will form a fibrous net at the loss zone and collect the solids from the drilling fluid to form a filter cake. Once the fibres form a filter cake on the loss zone, the thixotropic fluid that has been transported inside the loss zone will eventually be exposed to low overbalance pressure and fewer shear. Reduction in shear will transform the water based drilling fluid into a highly viscous fluid. Thixotropic fluid and glass fibres or other LCM that have been transported inside the loss zone will plug the loss circulation zones.

Other compounds that affect the properties of the fluid may also be added to the fluid at the surface. These compounds may react with the thixotropic agent when the agent is released into the fluid. For example; polyacrylamide and laponite may react to provide a swellable gel also suitable for lost circulation applications; and/or butadiene-stryene latex and polyoxypropylene may react to provide a plugging solution to reduce the permeability of the formation.

Example 1

A 2 wt % encapsulated dry suspension of Laponite™ (Rockwood Additives Ltd) is mixed in a Haildolph mixer at 200 rpm for 3 minutes with a 12 lbs/bbl (barrel) (34 kg/m$^3$) water based drilling fluid having 18% solid volume fraction. A Vane rheometer is used to measure critical yield stress development with respect to ageing time. A constant shear of $0.105^{sec-1}$ is used for the measurement yield shear. The yield stress of the dry suspension of encapsulated Laponite is compared with the yield stress development of 2 wt % natural Laponite (without encapsulation) in the same water based drilling fluid formulation. The results can be seen in FIG. 2.

Figure 2:
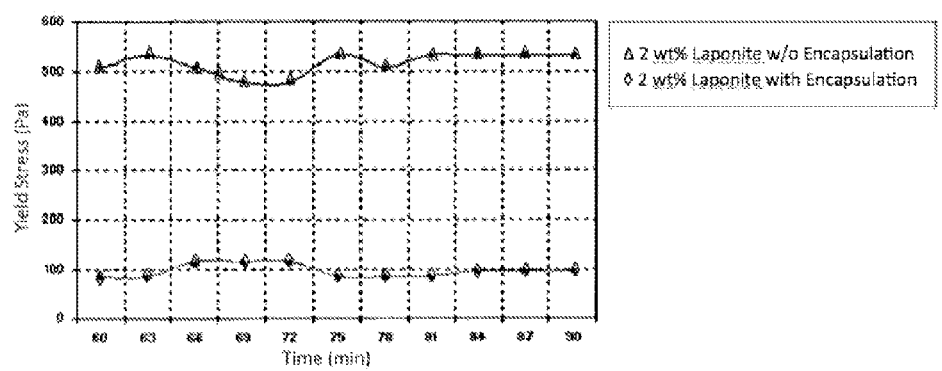
FIG. 2 shows a graph of the yield stress development after 60 minutes without shear: 2 wt % encapsulated Laponite and 2 wt % Laponite without encapsulation.

FIG. 2 shows the yield stress development after 60 mins of mixing 2 wt % natural Laponite without encapsulation and 2 wt % encapsulated dry suspension of Laponite. After 60 minutes 2 wt % Laponite (without encapsulation) is completely hydrated with a high yield stress compared to 2 wt % encapsulated dry suspension Laponite. This shows that the encapsulation protected the core active material (Laponite) and reduced its diffusion in the aqueous medium Example 2

Figure 3:
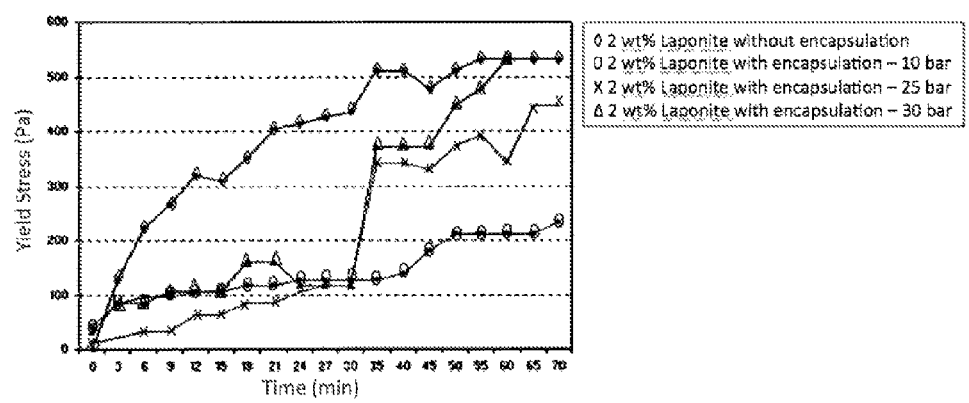
FIG. 3 shows a graph of the yield stress development at different pressure drops with shear after 30 minutes: 2 wt % Laponite without encapsulation, 2 wt % Laponite encapsulated Laponite at 10 bar, 2 wt % encapsulated Laponite at 30 bar and 2 wt % encapsulated Laponite at 25 bar.

A 2 wt % encapsulated dry suspension is mixed with the water based drilling fluid and kept non sheared for 30 minutes. After 30 minutes the drilling fluid is sheared at 10 bar, 25 bar and 30 bar. The yield stress development after each pressure drop is compared with a 2 wt % natural Laponite solution without encapsulation. The results are shown in FIG. 3.

The results show that a minimum pressure drop i.e. a certain shear, is required to release the active material from the encapsulation, and at 30 bar all the active material is released and the solution formed a yield stress equal to the 2 wt % Laponite without encapsulation i.e. base line solution. The results suggest that the encapsulation is robust and durable and the encapsulated material can be handled and mixed in the oil field with the oilfield equipment, without rupturing and releasing the thixotropic agent until required. For example the core material, i.e. Laponite, will only be completely exposed to the surrounding medium when it comes out through a drill bit restriction.

While the invention is described with reference to the use of the encapsulated thixotropic agent in a drilling fluid to prevent lost circulation the invention is also applicable to other fluids used in wellbore operations. The present invention can be used with drilling fluids, cement formulations and polymer systems to impart viscosifying and/or thixotropic effects. As well as loss circulation the present invention is also applicable to wellbore strengthening, cutting removals, etc.

Further changes within the scope of the invention will be apparent.

The invention claimed is:

1. A method of providing thixotropy to a fluid downhole comprising:
    adding an encapsulated thixotropic agent to a fluid at the surface, wherein the thixotropic agent comprises a dry suspension of synthetic layered silicates;
    introducing the fluid into a borehole; and
    subjecting the fluid to a shearing action so as to release the thixotropic agent into the fluid.

2. The method according to claim 1 wherein the thixotropic agent is encapsulated in a structure that degrades upon exposure to shear.

3. The method according to claim 2 wherein the structure comprises a coating of resin and porous silica.

4. The method according to claim 1 wherein the fluid is a drilling fluid, cementitious formulation or polymer pill.

5. The method according to claim 4 wherein the fluid is a water based drilling fluid.

6. The method according to claim 1 wherein the thixotropic agent comprises a hectorite clay.

7. The method according to claim 1 wherein the shearing action is caused by a restriction at the bottomhole assembly.

8. The method according to claim 7 wherein the thixotropic agent is released after the fluid exits the drill bit.

9. The method according to claim 1 wherein the thixotropic agent is released after the fluid exits a drill bit.

10. The method according to claim 1 wherein the thixotropic agent is present in the fluid in an amount of 1% to 10% by weight thereof.

11. The method according to claim 1 further comprising adding lost circulation material at the surface to the fluid.

12. The method according to claim 11 wherein the lost circulation material comprises flakes, organic fibers, inorganic fibers, multimodal particles, granules based on optimum particle size distribution or ideal packing theory, or combinations thereof.

13. A composition for providing thixotropy to a fluid downhole comprising a thixotropic agent wherein the thixotropic agent is encapsulated in a structure that degrades upon exposure to shear, such that the structure will rupture when subjected to shearing action, wherein the thixotropic agent comprises a dry suspension of synthetic layered silicates.

14. The composition of claim 13, wherein the shear sensitive structure comprises a coating of resin and porous silica.

15. The composition of claim 13, wherein the thixotropic agent comprises a hectorite clay.

16. The composition of claim 13, wherein the thixotropic agent is present in the fluid in an amount of 1% to 10% by weight thereof.

17. A method for wellbore treatment comprising
adding an encapsulated thixotropic agent to a fluid at the surface, wherein the thixotropic agent comprises a dry suspension of synthetic layered silicates;
introducing the fluid into a borehole; and
subjecting the fluid to a shearing action so as to release the thixotropic agent into the fluid.

18. The method of claim 17 wherein the treatment is at least one of lost circulation, wellbore strengthening during drilling, or cuttings removal.

* * * * *